United States Patent [19]

Hamada et al.

[11] Patent Number: 5,190,381
[45] Date of Patent: Mar. 2, 1993

[54] RELEASE BEARING ASSEMBLY

[75] Inventors: Tooru Hamada; Masahiko Iwase; Syogo Ohga, all of Neyagawa, Japan

[73] Assignee: Kabushiki Kaisha Daikin Seisakusho, Osaka, Japan

[21] Appl. No.: 793,344

[22] Filed: Jan. 14, 1992

[30] Foreign Application Priority Data

May 18, 1990 [JP] Japan ................... 2-51985[U]

[51] Int. Cl.⁵ .................................... F16C 19/10
[52] U.S. Cl. .................... 384/617; 384/537; 384/612
[58] Field of Search ........... 384/617, 537, 513, 584, 384/585, 615, 612

[56] References Cited

U.S. PATENT DOCUMENTS

| | | | |
|---|---|---|---|
| 4,608,741 | 9/1986 | Mallet | 384/617 |
| 4,815,867 | 3/1989 | Ladin | 384/617 |
| 4,969,755 | 11/1990 | Parzefall | 384/612 |

FOREIGN PATENT DOCUMENTS

| | | |
|---|---|---|
| 1-123231 | 8/1986 | Japan . |
| 2-18820 | 5/1990 | Japan . |
| 2-173423 | 7/1990 | Japan . |

*Primary Examiner*—Lenard A. Footland
*Attorney, Agent, or Firm*—Armstrong, Westerman, Hattori, McLeland & Naughton

[57] ABSTRACT

A release bearing assembly free from breakage and deformation, in which a force exerted from a release fork is not applied directly onto a sleeve. To this end, a cylindrical sleeve (7) guided by a guide (2) is not secured directly to a side plate (9) between an inner race (10) and the guide (2), as with a conventional structure. A cover (8) which has not hitherto been used, is used in the present invention. The cover (8) is secured to the side plate (9), and the cover (8) sandwiches the sleeve (7) in cooperation with a release bearing (6).

1 Claim, 1 Drawing Sheet

RELEASE BEARING ASSEMBLY

DESCRIPTION

1. Technical Field

This invention relates to a release bearing assembly for controlling engaging and disengaging operations of clutch for use in an automobile etc., and more particularly to a release bearing assembly suitable for a pull-type clutch in which a release bearing is pulled backward in a clutch axial direction (direction opposite to a clutch disc) by means of a release fork so as to disengage the clutch.

2. Background Art

This type of release bearing assembly generally includes a release bearing, a side plate and a sleeve as described in Japanese Unexamined Utility Model Publication No. 1-219925, for example. The sleeve fits freely slidably onto an outer peripheral surface of a cylindrical shaft secured to a clutch housing etc. and is active to locate the entire bearing assembly in a concentric position with a clutch output shaft. The release side plate has a portion engaging with a release fork and is located at a radial outside position in relation to the release bearing. The sleeve is located at a radial inside and backside of the release bearing, and its rear end outer periphery is secured to the side plate by crimping. The release bearing is disposed in an annular space located between the side plate and the sleeve, and an extension of an inner race extending forward from the space is interconnected through a connecting member to an inner peripheral part of a diaphragm spring of the clutch.

In the above structure, when a force inclining relative to the clutch axial direction is applied from the release fork to the side plate, the entire release bearing is apt to incline in a direction of force. On the other hand, the sleeve is guided by a stationary cylindrical shaft (guide) so that it tends to align the entire release bearing assembly in a noninclining position. As the result, an excessive force would be produced at the crimping part between the side plate and the sleeve so as to cause looseness or breakage at this part.

An object of this invention is to provide a structure to solve the foregoing problem.

DISCLOSURE OF THE INVENTION

Technical measure

In order to accomplish the above object, in this invention; a release bearing including an inner race, an outer race and balls installed between them is disposed around a cylindrical guide extending in a clutch axial direction, a cylindrical part of a cylindrical sleeve guided by an outer peripheral surface of the guide is disposed between the inner race and the guide, a radial outward extension is provided at one end of the sleeve, the extension is made contact with one end face of the outer race, a cover facing on the one end face is installed with the extension sandwiched between them, an annular body of the side plate is made engage with the other end face of the outer race, the side plate includes a cylindrical outer peripheral part and an engaging part and a clamping part, the cylindrical outer peripheral part extending from an outer peripheral end of the annular body along and over a radial outside of an outer race, the cylindrical outer peripheral part and the engaging part extending from an opposite-to-the-body end of the outer peripheral part to a radial outside, a portion engaging with a release fork is formed on the engaging part, an outer peripheral edge of the cover is secured to an outer peripheral edge of the clamping part, and a contacting part contacting with the extension of the sleeve so as to make the extension contact with the one end face of the outer race.

Function

In the above structure, the side plate tends to incline relative to the clutch axial direction when the operation force exerted from the release fork to the side plate is inclining relative to the clutch axial direction. On the other hand, the cylindrical sleeve is guided by the cylindrical guide, which is positioned at the inside of the sleeve, so as to be always kept in the position not inclining relative to the clutch output shaft. Accordingly, the side plate and the sleeve tend to incline relative to each other. However, the crimped portion does not exist between the both, and the sleeve is sandwiched between a part (contacting part) of the cover crimped to the side plate and the outer race. Therefore, an excessive force corresponding to the inclining force exerted from the release fork on the side plate is not applied locally on the sleeve, and resulting deformation and breakage do not occur on the sleeve and the other components.

BEST MODE FOR CARRYING OUT THE INVENTION

Figure 1:
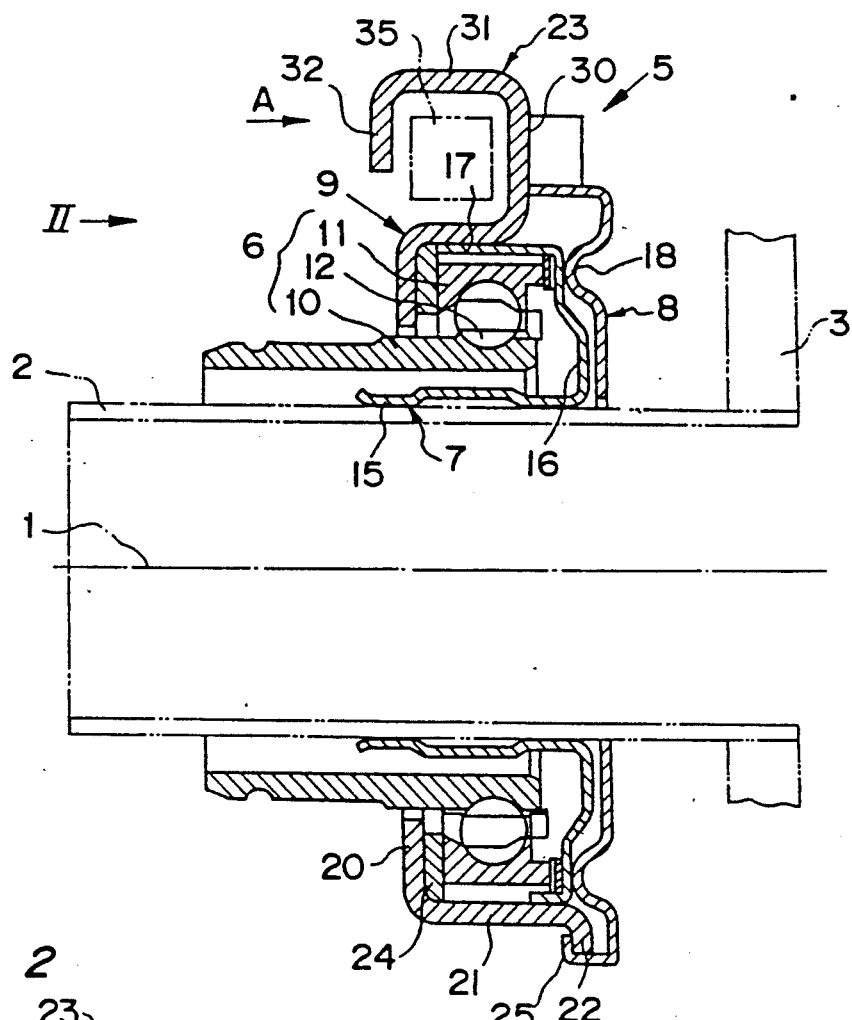
FIG. 1 is a sectional view of an embodiment of this invention.
Figure 2:
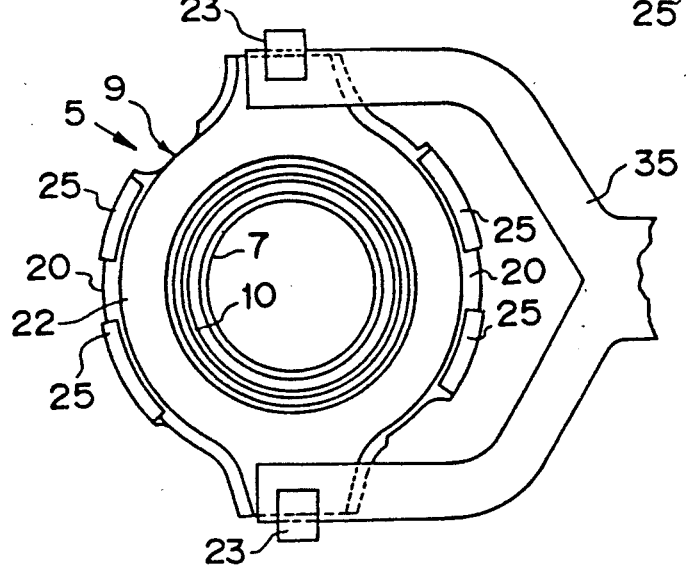
FIG. 2 is a view viewed in a direction of arrow II of FIG. 1.

FIG. 1 is the sectional view of the embodiment of this invention, and FIG. 2 is the view viewed in the direction of arrow II of FIG. 1. In FIG. 1, a cylindrical-shaft-shaped guide 2 is disposed around and coaxially with a clutch output shaft 1 (only its center axis being shown). The guide 2 is rigidly secured to an end wall of a clutch housing 3 and extends forward (to a not-shown clutch disc side) from the end wall. A release bearing assembly 5 is disposed around the guide 2 and is located between the end wall of the clutch housing 3 and a diaphragm spring (not shown) installed at its front side.

The release bearing assembly 5 includes a release bearing 6, a sleeve 7, a cover 8 and a side plate 9. The release bearing 6 principally includes an inner race 10, an outer race 11 and balls 12 disposed between them. The inner race 10 extends forward from the outer race 11, and its extending end is connected to an inner peripheral part of the diaphragm spring through a connecting mechanism not shown. The diaphragm spring is designed in such a way that the clutch is disengaged when the inner peripheral part of the diaphragm spring is pulled backward (in a direction A) by the release bearing assembly 5.

The sleeve 7 is a bent component made of a thin steel plate and includes cylindrical part 15, an annular extension 16 extending radially outwardly from its rear end and contacting parts 17 protruding forward from plural places on an outer periphery of the extension 16 with spaces left in the circumferential direction. The cylindrical part 15 contacts freely slidably with an outer peripheral surface of the guide 2. An outer peripheral part of the extension 16 contacts with a rear end face of the outer race 11. To be more concrete, the outer peripheral part of the extension 16 contacts with the rear end face of the outer race 11 through an aligning wave spring in the illustrated embodiment. The contacting part 17 is spaced from an outer peripheral surface of the outer race 11 with a slight clearance left between them.

The cover is also a bent component made of a thin steel plate, and extends substantially along a surface of the extension 16. The cover 8 stands close by a rear side of the extension 16, a contacting part 18 is formed by a curved surface extending forward at a portion near to its outer periphery. This contacting part 18 contacts with the outer peripheral portion of the extension 16. The sleeve 7 contacts with the cover 8 and the release bearing 6 only at the outer peripheral portion of the extension 16, and the other portions are separated from them. Namely, the sleeve 7 is sandwiched between the outer race 11 and the contacting part 18 only at the outer peripheral portion of the extension 16.

The side plate 9 is a bent component made of a comparatively thick steel plate. The side plate 9 includes a substantially annular side plate body 20 located at a front side of the outer race 11, a cylindrical outer peripheral part 21 extending backward from an outer peripheral portion of the side plate body 20, and a clamping part 22 and an engaging part 23 extending radially outwardly from a rear end of the outer peripheral part 21. The side plate body 20 engages freely slidably with a front end face of the outer race 11 through an annular plate 24 made of synthetic resin. The outer peripheral part 21 is located at a radial outside of the outer race 11, and the contacting part 17 contacts with its inner peripheral surface. The clamping part 22 is short in its radial length. A folded part 25 formed on an outer periphery of the cover 8 is in contact with and secured by crimping to an outer peripheral surface and a front end face of the clamping part 22.

The foregoing engaging part 23 includes a portion 30 extending radially outwardly from the outer peripheral part 21, a portion 31 extending forward from an outer peripheral end of the portion 30, and a portion 32 extending radially inwardly from a front end of the portion 31. A release fork 35 comes in a space surrounded by the engaging part 23.

The release fork 35 is supported freely swingingly by a support means (not shown) mounted to the housing 3, and is connected to an external operation mechanism not shown. When the operation mechanism is operated in a direction to disengage the clutch, the release fork 35 engages with the portion 30 to move the entire release bearing assembly 5 to the backside (A) so that the clutch is thereby disengaged.

In FIG. 2, the release fork 35 connects to the engaging part 23 at its forked ends, and the engaging part 23 is therefore formed at two places opposing in diametral direction of the side plate 9 corresponding to the forked ends. The clamping part 22 is also formed at two places opposing in diametral direction of the side plate 9. The clamping parts 22 are spaced from the both engaging parts 23 with clearances left between them in the circumferential direction, and are formed for comparatively long ranges in the circumferential direction. The foregoing folded part 25 is formed at totally four places with spaces left between them in the circumferential direction, and two folded parts 25 are crimped to each clamping part 22 respectively.

According to the above-mentioned structure, the side plate 9 tends to incline relative to the clutch axial direction when the operation force for disengaging the clutch exerted from the release fork to the side plate is inclined relative to the clutch axial direction. On the other hand, the cylindrical sleeve 7 is guided by the cylindrical guide 2, which is located at the inside of the sleeve, so as to be always kept in the position not inclining relative to the clutch output shaft 1. Accordingly, the side plate 9 and the sleeve 7 tend to incline relative to each other. However, the crimped portion does not exist between the both, and the sleeve is sandwiched between the part (contacting part 18) of the cover 8 crimped to the side plate 9 and the outer race 11. Therefore, even if the inclining force is exerted from the release fork 35 to the side plate 9, the excessive force corresponding to the inclining force is not applied locally on the sleeve 7 and the other components, so that the resulting deformation and breakage do not occur on the other components.

EFFECT OF THE INVENTION

As described above, in the present invention; the sleeve 7 guided by the guide 2 is not secured directly to the side plate 9 as with the conventional structure. The cover 8 is used, which has not been used in the conventional structure. The cover 8 is secured to the side plate 9, and the cover 8 is designed to sandwich the sleeve 7 in cooperation with the release bearing 6. Consequently, there is no chance for the inclining force which is exerted from the release fork 35 to the side plate 9, to directly active on the sleeve 7. Therefore, the local force is prevented from acting on each part, and the breakage and deformation can be prevented effectively.

INDUSTRIAL APPLICABILITY

The release bearing is improved in durability so that it is best suited for clutches for use in automobiles.

What is claimed is:

1. A release bearing assembly, in which a release bearing including an inner race, an outer race and balls installed between them is disposed around a cylindrical guide extending in a clutch axial direction, a cylindrical part of a cylindrical sleeve guided by an outer peripheral surface of the guide is disposed between the inner race and the guide, a radial outward extension is provided at one end of the sleeve, the extension is made contact with one end face of the outer race, a cover facing on the one end face is installed with the extension sandwiched between them, an annular body of the side plate is made engage with the other end face of the outer race, the side plate includes a cylindrical outer peripheral part and an engageing part and a clamping part, the cylindrical outer peripheral part extending from an outer peripheral end of the annular body along and over a radial outside of an outer peripheral surface of the outer race, the cylindrical outer peripheral part and the engageing part extending from an opposite-to-the-body end of the outer peripheral part to a radial outside, a portion engaging with a release fork is formed on the engaging part, an outer peripheral edge of the cover is secured to an outer peripheral edge of the clamping part, and a contacting part contacting with the extension of the sleeve so as to make the extension contact with the one end face of the outer race.

* * * * *

UNITED STATES PATENT AND TRADEMARK OFFICE
CERTIFICATE OF CORRECTION

PATENT NO. : 5,190,381
DATED : March 2, 1993
INVENTOR(S): HAMADA et al.

It is certified that error appears in the above-identified patent and that said Letters Patent is hereby corrected as shown below:

On the cover page, Item [22], "Filed: Jan. 14, 1992" should read --PCT Filed: May 9, 1991--.

On the cover page, after Item [22], insert
--Item [86]  PCT No.: PCT/JP91/00618
             § 371 Date: Jan. 14, 1992
             § 102(e) Date: Jan. 14, 1992
  Item [87]  PCT Pub. No.: WO91/18220
             PCT Pub. Date: Nov. 28, 1991--..

Signed and Sealed this

Sixth Day of June, 1995

Attest:

BRUCE LEHMAN

Attesting Officer

Commissioner of Patents and Trademarks